US009539826B2

(12) United States Patent
Okumura

(10) Patent No.: US 9,539,826 B2
(45) Date of Patent: Jan. 10, 2017

(54) RECORDING MEDIUM DETECTION DEVICE AND IMAGE RECORDING APPARATUS

(71) Applicant: SEIKO EPSON CORPORATION, Tokyo (JP)

(72) Inventor: Naoyuki Okumura, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/478,804

(22) Filed: Sep. 5, 2014

(65) Prior Publication Data

US 2015/0085303 A1 Mar. 26, 2015

(30) Foreign Application Priority Data

Sep. 20, 2013 (JP) ................................ 2013-195082

(51) Int. Cl.
*G06F 15/00* (2006.01)
*B41J 11/00* (2006.01)

(52) U.S. Cl.
CPC .................................. *B41J 11/0095* (2013.01)

(58) Field of Classification Search
CPC .............. G06K 15/021; G06K 15/4025; G06K 15/4065
USPC ........................................................ 358/1.15
See application file for complete search history.

(56) References Cited

U.S. PATENT DOCUMENTS 6,471,425 B1 * 10/2002 Cornelius et al. ............ 400/283
2003/0016276 A1 1/2003 Jeanmaire
2013/0020758 A1 * 1/2013 Momose et al. .............. 271/227
2013/0043415 A1 * 2/2013 Misao ...................... 250/559.15

FOREIGN PATENT DOCUMENTS

JP 2001-239715 A 9/2001
JP 2003-039683 A 2/2003
JP 2004-018194 A 1/2004

* cited by examiner

*Primary Examiner* — Tammy Pham
*Assistant Examiner* — Mark Milia
(74) *Attorney, Agent, or Firm* — Global IP Counselors, LLP

(57) ABSTRACT

An image recording apparatus having a plurality of sensors for performing a detection with respect to a recording medium is provided, with which it is made possible for each of the plurality of sensors to detect the state of the recording medium at a desired position of the recording medium even in a case where the width of the recording medium being used has been modified. The image recording apparatus includes a conveyance part configured to convey the recording medium, a first sensor configured to perform a detection with respect to the recording medium, a second sensor configured to perform a detection with respect to the recording medium, and a positional relationship regulation part configured to regulate a positional relationship between the first sensor and the second sensor. The first sensor and the second sensor are movable in conjunction with one another by moving the positional relationship regulation part.

8 Claims, 6 Drawing Sheets

1

RECORDING MEDIUM DETECTION DEVICE AND IMAGE RECORDING APPARATUS

CROSS-REFERENCE TO RELATED APPLICATIONS

This application claims priority to Japanese Patent Application No. 2013-195082 filed on Sep. 20, 2013. The entire disclosure of Japanese Patent Application No. 2013-195082 is hereby incorporated herein by reference.

BACKGROUND

Technical Field

The present invention generally relates to an image recording apparatus provided with a plurality of sensors for detecting a recording medium.

Related Art

Image recording apparatuses (a label printer and a printer) for conveying a recording medium configured so as to be continuous in a direction of conveyance by joining different recording media together, and recording an image onto the recording medium are conventionally known in the art (see Japanese Unexamined Patent Application Publication Nos. 2001-239715 (Patent Document 1) and 2003-039683 (Patent Document 2), for example). Some such image recording apparatuses have sensors for detecting the state of the recording medium. For example, the image recording apparatuses disclosed in Patent Documents 1 and 2 are equipped with seam sensors for detecting a seam of the recording medium, in order to control the image recording in accordance with the position of the seam of the recording medium.

SUMMARY

In relation thereto, it being important to detect the seam of the recording medium with the seam sensors when properly executing the image recording on the recording medium, it is simultaneously also important to detect a width-direction end of the recording medium with an edge sensor. This is because, among other examples, there are some instances where the recording medium meanders and an end of the recording medium shifts in the width direction when the recording medium is conveyed in the direction of conveyance, and having ascertained the position of the end of the recording medium in the width direction is conducive to proper image recording. Additionally, an image recording apparatus may in some instances have a plurality of sensors for detecting the state of the recording medium in accordance with need, such as a film thickness sensor for measuring a film thickness of the recording medium. Such sensors for detecting the state of the recording medium often perform the detections of the recording medium at an end part of the recording medium.

Incidentally, in cases such as where, for example, recording media of different widths have been joined together with the respective centers thereof matched together, then the positions of the ends of the recording media are different in a case where the recording media of different widths are used to perform image recording. Therefore, there are some instances where it becomes necessary to move the plurality of sensors in the width direction, in response to the fact that the ends of the recording media have different positions in the width direction.

The present invention has been made in view of the problem described above, and an advantage thereof is to provide the feature of an image recording apparatus having a plurality of sensors for performing a detection with respect to a recording medium, wherein the feature makes it possible for each of the plurality of sensors to detect the state of the recording medium at a desired position of the recording medium even in a case where the width of the recording medium being used has been modified.

An image recording apparatus as an aspect of the present invention, in order to achieve the purpose described above, includes a conveyance part configured to convey a recording medium, a first sensor configured to perform a detection with respect to the recording medium, a second sensor configured to perform a detection with respect to the recording medium at a position different from that of the first sensor, and a positional relationship regulation part configured to regulate a positional relationship between the first sensor and the second sensor. The first sensor and the second sensor are movable in conjunction with one another by moving the positional relationship regulation part.

A recording medium detection device as an aspect of the present invention, in order to achieve the purpose described above, includes a first sensor configured to perform a detection with respect to a recording medium, a second sensor configured to perform a detection with respect to the recording medium, and a positional relationship regulation part configured to regulate a positional relationship between the first sensor and the second sensor. The first sensor and the second sensor are movable in conjunction with one another by moving the positional relationship regulation part.

With the aspect of the invention thus configured (the image recording apparatus, the recording medium detection device), moving the positional relationship regulation part for regulating the positional relationship between the first sensor and the second sensor makes it possible to move the first sensor and the second sensor in conjunction with one another. As such, both the first sensor and the second sensor can be moved at once. As a result, the work of moving the first sensor and the work of moving the second sensor need not be performed separately, but rather the work of moving the two sensors can be performed efficiently and workability is successfully improved.

The image recording apparatus may be configured so that the positional relationship regulation part has a carriage that is movable in a state where the positional relationship between the first sensor and the second sensor is relatively retained. With such a configuration, moving the carriage makes it possible to move both the first sensor and the second sensor at once. As a result, the work of moving the first sensor and the work of moving the second sensor need not be performed separately, but rather the work of moving the two sensors can be performed efficiently and workability is successfully improved.

The image recording apparatus may be configured so as to include a guide part configured to guide movement of the carriage in a direction intersecting with a direction of conveyance of the recording medium. The configuration of such description allows for the carriage to be easily moved in accordance with the guiding by the guide part, and contributes to improving the workability for a worker.

The image recording apparatus may be configured so as to include a vibration suppression member attached to the carriage to face the recording medium being conveyed, and configured to suppress vibration of the recording medium being conveyed. With the configuration of such description, it becomes possible to stably perform the detections by the first sensor and the second sensor, because the vibration of the recording medium is suppressed by the vibration suppression member facing the recording medium. Moreover, the vibration suppression member is attached to the carriage. As such, the configuration of such description contributes to improving the workability for the worker because the work of moving the vibration suppression member can be performed alongside the work of moving the first sensor and the second sensor.

Here, the first sensor may be an edge sensor that is configured to detect an end of the recording medium. As an example, an ultrasonic sensor could be used as the edge sensor. The second sensor may be a seam sensor that is configured to detect a seam of the recording medium. As an example, an optical sensor could be used as the seam sensor. In a case where an optical seam sensor is used, then the seam can be properly detected by, for example, detecting a difference in color between the recording medium and a splicing tape bonded to the seam.

The image recording apparatus may be configured so that the seam sensor is configured to irradiate the recording medium with light from a direction inclined in a direction of conveyance with respect to a normal line of the recording medium at a position facing the seam sensor, and is configured to detect the light reflected from the recording medium. With the configuration of such description, a spot of the light with which the recording medium is irradiated is narrower in a direction (the width direction) orthogonal to the direction of conveyance, compared to the direction of conveyance. As such, the spots of light can properly be made to fall within a blank region provided to an end part in the width direction of the recording medium in such a case as where, for example, the seam is detected by detecting the difference in color between the splicing tape and the blank region. As a result, it is possible to suppress any instances where light from an image recorded in a location out of the blank region is received and erroneously detected as being a seam.

BRIEF DESCRIPTION OF THE DRAWINGS

Referring now to the attached drawings which form a part of this original disclosure.

DETAILED DESCRIPTION OF EMBODIMENTS

Figure 1:
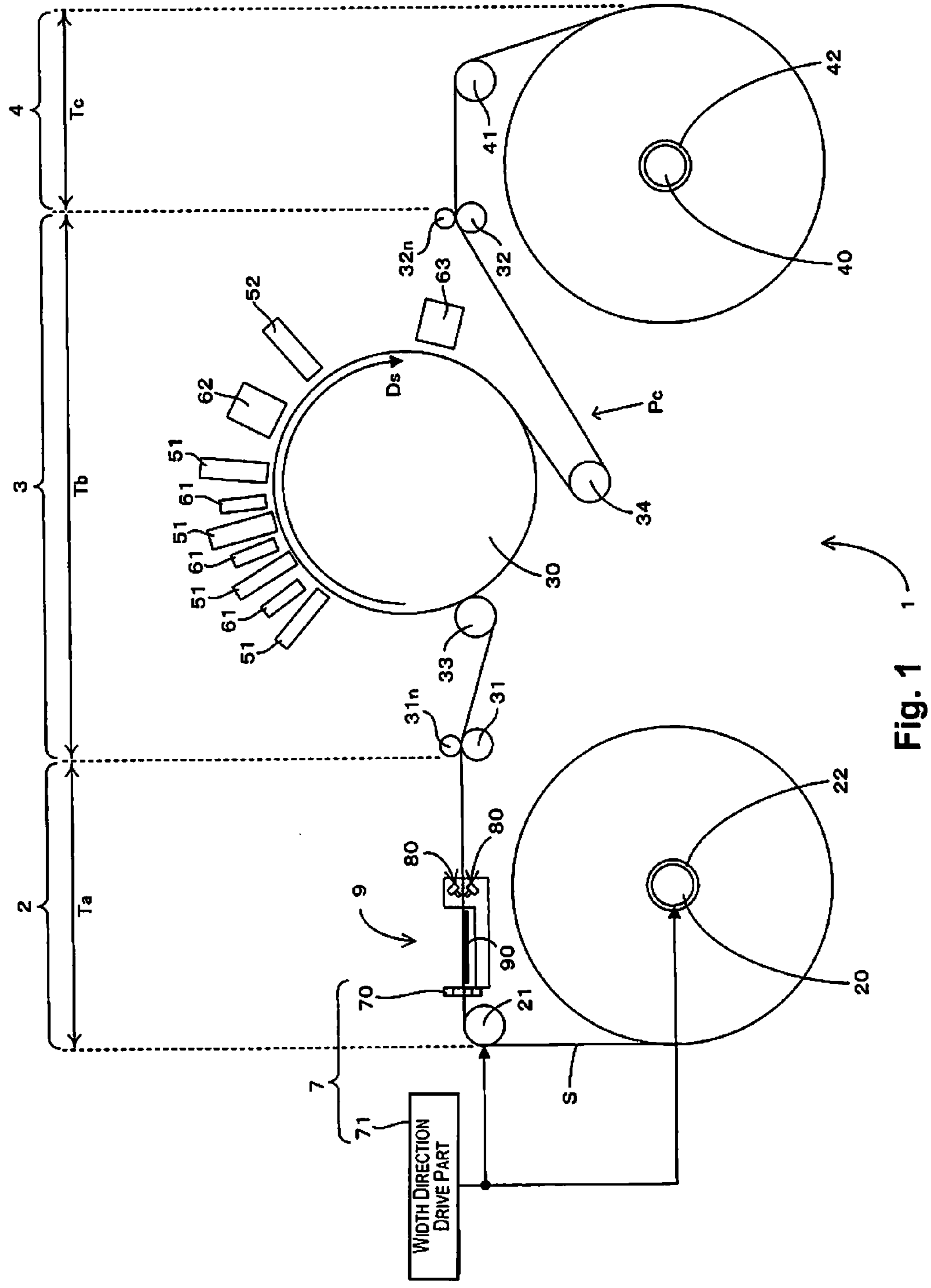
FIG. 1 is a drawing illustrating one example of an apparatus configuration provided to a printer to which the present invention can be applied.

FIG. 1 is a front view schematically illustrating an example of an apparatus configuration provided to a printer to which the present invention can be applied. As illustrated in FIG. 1, in a printer 1, a single sheet S (web) both ends of which have been wound up in the shape of a roll around a feed-out spindle 20 and a take-up spindle 40 is extended in a tensioned state along a conveyance path Pc, and the sheet S undergoes image recording while also being conveyed in a direction of conveyance Ds going from the feed-out spindle 20 toward the take-up spindle 40. The type of the sheet S is largely divided into paper-based and film-based. As specific examples, paper-based includes high-quality paper, cast paper, art paper, coated paper, and the like, while film-based includes synthetic paper, PET (polyethylene terephthalate), PP (polypropylene), and the like. As an overview, the printer 1 is provided with: a feed-out part 2 (feed-out region) for feeding the sheet S out from the feed-out spindle 20; a process part 3 (process region) for recording an image onto the sheet S fed out from the feed-out part 2; and a take-up part 4 (take-up region) for taking the sheet S, onto which an image was recorded at the process part 3, up into the take-up spindle 40. In the following description, whichever side of the two sides of the sheet S is the one on which the image is recorded is referred to as the "(front) surface", while the side opposite thereto is referred to as the "reverse surface".

The feed-out part 2 has the feed-out spindle 20, around which an end of the sheet S has been wound, as well as a driven roller 21 around which the sheet S having been drawn out from the feed-out spindle 20 is wound. The feed-out spindle 20 supports the end of the sheet S wound therearound in a state where the front surface of the sheet S faces outward. Then, rotation of the feed-out spindle 20 in the clockwise direction in FIG. 1 causes the sheet S having been wound around the feed-out spindle 20 to be fed out to the process part 3, passing by way of the driven roller 21. The sheet S is wound up around the feed-out spindle 20 with a core tube 22 therebetween, the core tube 22 being detachable with respect to the feed-out spindle 20. As such, once the sheet S on the feed-out spindle 20 has been used up, then a new core tube 22 around which a roll of the sheet S has been wound can be mounted onto the feed-out spindle 20 to replace the sheet S of the feed-out spindle 20.

Both the feed-out spindle 20 and the driven roller 21 are movable in a width direction Dw (the direction perpendicular to the plane in FIG. 1) orthogonal to the direction of conveyance Ds, and the feed-out part 2 is equipped with a steering mechanism 7 for suppressing any meandering of the sheet S by adjusting the positions of the feed-out spindle 20 and the driven roller 21 in the width direction Dw (axial direction). This steering mechanism 7 is constituted of an edge sensor 70 and a width direction drive part 71. The edge sensor 70 is provided opposite to an end of the sheet S in the width direction Dw, on the downstream side of the driven roller 21 in the direction of conveyance Ds, and detects the position of the end of the sheet S in the width direction Dw. The width direction drive part 71 suppresses and meandering of the sheet S by adjusting the positions of the feed-out spindle 20 and the driven roller 21 in the width direction Dw on the basis of a result of detection of the edge sensor 70.

Furthermore, the feed-out part 2 has a sheet detection device 9 arranged on the downstream side of the direction of conveyance Ds relative to the driven roller 21. This sheet detection device 9 is configured so as to bear the responsible of a variety of detection operations executed on the sheet S, and in addition to having the edge sensor 70, which constitutes a part of the steering mechanism 7, the sheet detection device 9 also has seam sensors 80. Thus, the end of the sheet S in the width direction Dw is detected by the edge sensor 70, and also the seam of the sheet S is detected by the seam sensors 80. The sheet detection device 9 also has splicing table 90 and, in addition to the detection function, also has the additional function of assisting with splicing done by a worker.

The process part 3 is for performing processes as appropriate and recording an image onto the sheet S by using a variety of function parts 51, 52, 61, 62, 63 arranged along the outer peripheral surface of a rotating drum 30, while the sheet S having been fed out from the feed-out part 2 is supported on the rotating drum 30. At this process part 3, a front drive roller 31 and a rear drive roller 32 are provided to both sides of the rotating drum 30; the sheet S, which is conveyed from the front drive roller 31 to the rear drive roller 32 is supported on the rotating drum 30 and undergoes the recording of an image.

The front drive roller 31 has on the outer peripheral surface a plurality of minute projections formed by thermal spraying, and the sheet S having been fed out from the feed-out part 2 is wound around from the reverse surface side. The front drive roller 31 rotates in the clockwise direction in FIG. 1 and thereby conveys, toward the downstream side of the conveyance path, the sheet S that has been fed out from the feed-out part 2. A nip roller 31*n* is provided to the front drive roller 31. This nip roller 31*n* is urged toward the front drive roller 31 side and in this state abuts against the front surface of the sheet S, and nips the sheet S between the front drive roller 31 and the nip roller 31*n*. This ensures the force of friction between the front drive roller 31 and the sheet S, and makes it possible for the front drive roller 31 to reliably convey the sheet S.

The rotating drum 30 is a drum of cylindrical shape having a diameter of, for example, 400 mm, rotatably supported by a support mechanism (not shown), and winds the sheet S conveyed from the front drive roller 31 to the rear drive roller 32 up from the back surface side. This rotating drum 30 is for supporting the sheet S from the reverse surface side while also being rotatingly driven in the direction of conveyance Ds of the sheet S, in response to the force of friction with the sheet S. Here, in the process part 3 there are provided driven rollers 33, 34 that loop the sheet S back at both sides of the part wound about the rotating drum 30. Of these, the driven roller 33 has the front surface of the sheet S wound around between the front drive roller 31 and the rotating drum 30 and loops the sheet S back. The driven roller 34, in turn, winds the front surface of the sheet S around between the rotating drum 30 and the rear drive roller 32 and loops the sheet S back. This manner of looping the sheet S back at the upstream and downstream sides in the direction of conveyance Ds relative to the rotating drum 30 makes it possible to ensure the length of the wind-up part of the sheet S for wind-up onto the rotating drum 30.

The rear drive roller 32 has on the outer peripheral surface a plurality of minute projections formed by thermal spraying, and the sheet S having been conveyed from the rotating drum 30 via the driven roller 34 is wound therearound from the reverse surface side. The rear drive roller 32 rotates in the clockwise direction in FIG. 1 and thereby conveys the sheet S toward the take-up part 4. A nip roller 32*n* is provided to the rear drive roller 32. This nip roller 32*n* is urged toward the rear drive roller 32 and in this state abuts against the front surface of the sheet S, and nips the sheet S between the rear drive roller 32 and the nip roller 32*n*. This ensures the force of friction between the rear drive roller 32 and the sheet S, and makes it possible for the rear drive roller 32 to reliably convey the sheet S.

In this manner, the sheet S being conveyed from the front drive roller 31 to the rear drive roller 32 is supported on the outer peripheral surface of the rotating drum 30. Also, at the process part 3, in order to record a color image onto the front surface of the sheet S being supported on the rotating drum 30, a plurality of recording heads 51 corresponding to mutually different colors are provided. Specifically, four recording heads 51 corresponding to yellow, cyan, magenta, and black are lined up in the stated order of colors in the direction of conveyance Ds. Each of the recording heads 51 faces, spaced apart with a slight clearance, the front surface of the sheet S having been wound around the rotating drum 30, and discharges ink (coloring ink) of the corresponding color from nozzles in an inkjet format. When each of the recording heads 51 discharges ink onto the sheet S being conveyed in the direction of conveyance Ds, a color image is thereby formed on the front surface of the sheet S.

Here, the ink used is a UV (ultraviolet) ink that is cured by being irradiated with ultraviolet rays (light) (i.e., is a photo-curable ink). Therefore, in the process part 3, UV irradiators 61, 62 (light irradiation parts) are provided in order to cure the ink and fix the ink to the sheet S. The execution of this curing of the ink is divided into two stages, which are temporary curing and true curing. A UV irradiator 61 for temporary curing is arranged in between each of the plurality of recording heads 51. In other words, the UV irradiators 61 are intended to irradiate with ultraviolet rays of low irradiation intensity and thereby cure the ink to such an extent that the ink wets and spreads sufficiently slower than when not irradiated with ultraviolet rays (that is, is intended to temporarily cure the ink), and is not intended to truly cure the ink. The UV irradiator 62 for true curing, meanwhile, is provided to the downstream side in the direction of conveyance Ds relative to the plurality of recording heads 51. Namely, the UV irradiator 62 is intended to irradiate with ultraviolet rays of a greater irradiation intensity than the UV irradiators 61, and thereby cure the ink to such an extent that the wetting and spreading of the ink stops (i.e., is intended to truly cure the ink).

In this manner, the color inks discharged onto the sheet S from the recording heads 51 on the upstream side of the direction of conveyance Ds are temporarily cured by the UV irradiators 61 arranged between each of the plurality of recording heads 51. As such, the ink discharged onto the sheet S by one recording head 51 is temporarily cured until arrival at the recording head 51 that is adjacent to the one recording head 51, on the downstream side of the direction of conveyance Ds. The occurrence of color mixing, where color inks of different colors mix together, is thereby suppressed. In this state where color mixing has been suppressed, the plurality of recording heads 51 discharge the color inks of mutually different colors and form the color image on the sheet S. Furthermore, the UV irradiator 62 for true curing is provided further downstream in the direction of conveyance Ds than the plurality of recording heads 51. Therefore, the color image that has been formed by the plurality of recording heads 5I is truly cured by the UV irradiator 62 and fixed onto the sheet S.

A recording head 52 is also provided to the downstream side in the direction of conveyance Ds relative to the UV irradiator 62. This recording head 52 faces, spaced apart with a slight clearance, the front surface of the sheet S that is wound up around the rotating drum 30, and discharges a transparent UV ink onto the front surface of the sheet S in an inkjet format from a nozzle. In other words, the transparent ink is additionally discharged onto the color image formed by the recording heads 51 of the four different colors. This transparent ink is discharged onto the entire surface of the color image, and endows the color image with a glossy or matte texture. A UV irradiator 63 is also provided to the downstream side in the direction of conveyance Ds relative to the recording head 52. This UV irradiator 63 is intended to irradiate with intense ultraviolet rates and thereby truly cure the transparent ink discharged by the recording head 52. This makes it possible to fix the transparent ink onto the front surface of the sheet S.

In this manner, at the process part 3, the sheet S wound around the outer peripheral part of the rotating drum 30 undergoes the discharging and curing of the inks as appropriate, thus forming a color image coated with the transparent ink. The sheet S on which the color image has been formed is then conveyed toward the take-up part 4 by the rear drive roller 32.

In addition to the take-up spindle 40 around which an end of the sheet S is wound, the take-up part 4 also has a driven roller 41 around which the sheet S is wound from the reverse surface side between the take-up spindle 40 and the rear drive roller 32. The take-up spindle 40 supports one end of the sheet S taken up therearound in a state where the front surface of the sheet S is facing outward. In other words, when the take-up spindle 40 is rotated in the clockwise direction in FIG. 1, the sheet S, which has been conveyed from the rear drive roller 32, passes through the driven roller 41 and is taken up around the take-up spindle 40. Here, the sheet S is taken up around the take-up spindle 40 with a core tube 42 therebetween, the core tube 42 being detachable with respect to the take-up spindle 40. As such, when the sheet S taken up around the take-up spindle 40 is full, then it becomes possible to remove the sheet S with the core tube 42.

Figure 2:
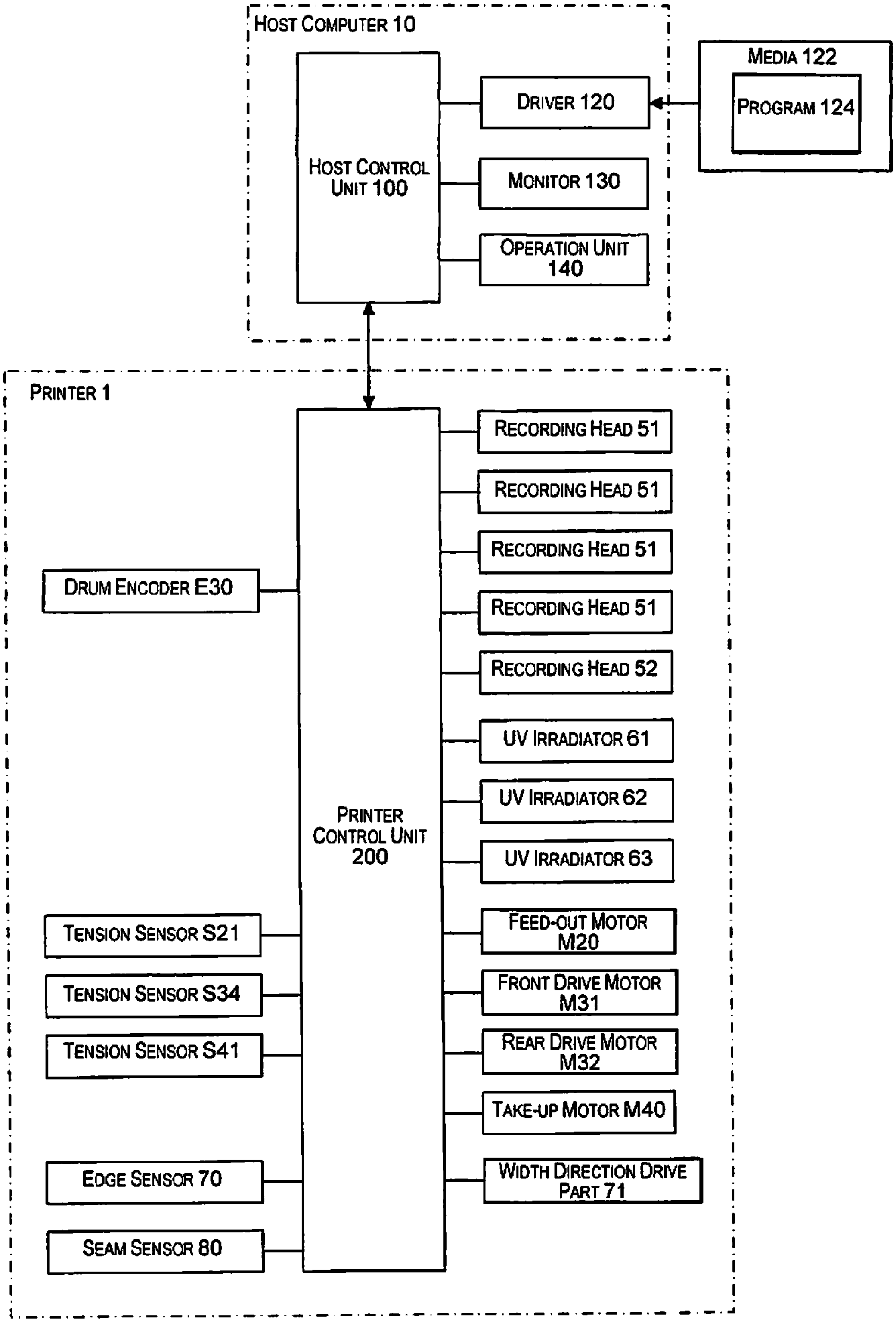
FIG. 2 is a drawing schematically illustrating an electrical configuration for controlling the printer illustrated in FIG. 1.

The foregoing is a summary of the apparatus configuration of the printer 1. The following description shall relate to the electrical configuration for controlling the printer 1. FIG. 2 is a block diagram schematically illustrating the electrical configuration for controlling the printer illustrated in FIG. 1. The operation of the printer 1 described above is controlled by a host computer 10 illustrated in FIG. 2. With the host computer 10, a host control unit 100 for governing all control operations is constituted of a CPU (Central Processing Unit) and a memory. A driver 120 is also provided to the host computer 10, and this driver 120 reads out a program 124 from media 122. The media 122 can be a variety of different things, such as a CD (Compact Disk), DVD (Digital Versatile Disk), or USB (Universal Serial Bus) memory. The host control unit 100 also controls each of the parts of the host computer 10 and controls the operation of the printer 1, on the basis of the program 124 having been read out from the media 122.

A monitor 130 constituted of a liquid crystal display or the like and an operation unit 140 constituted of a keyboard, mouse, or the like are provided to the host computer 10 as interfaces for interfacing with an operator. In addition to an image to be printed, a menu screen is also displayed on the monitor 130. As such, by operating the operation unit 140 while also checking the monitor 130, the operator is able to open up a print setting screen from the menu screen and set the type of printing medium, the size of printing medium, the quality of printing, and a variety of other print conditions. A variety of modifications could be made to the specific configuration of the interface for interfacing with the operator; for example, a touch panel-type display may be used as the monitor 130, the operation unit 140 being then constituted of the touch panel of this monitor 130.

On the other hand, in the printer 1, a printer control unit 200 for controlling each of the parts of the printer 1 in accordance with a command from the host computer 10 is also provided. Each of the apparatus parts for the recording heads, the UV irradiators, and the sheet conveyance system are controlled by the printer control unit 200. The details of the manner in which the printer control unit 200 controls each of the apparatus parts are as follows.

The printer control unit 200 controls the ink discharge timing of each of the recording heads 51 for forming the color image, in accordance with the conveyance of the sheet S. More specifically, the control of the ink discharge timing is executed on the basis of the output (detection value) of a drum encoder E30 that is attached to a rotating shaft of the rotating drum 30 and detects the position of rotation of the rotating drum 30. In other words, because the rotating drum 30 is rotatingly driven in association with the conveyance of the sheet S, it is possible to ascertain the position of conveyance of the sheet S when the output of the drum encoder E30 for detecting the position of rotation of the rotating drum 30 is consulted. In view thereof, the printer control unit 200 generates a pts (print timing signal) signal from the output of the drum encoder E30 and controls the ink discharge timing of each of recording heads 51 on the basis of the pts signal, whereby the ink having been discharged by each of the recording heads 51 strikes a target position on the sheet S that is being conveyed, thus forming the color image.

The timing whereby the recording head 52 discharges the transparent ink, too, is controlled by the printer control unit 200 in a similar fashion on the basis of the output of the drum encoder E30. This makes it possible for the transparent ink to be accurately discharged onto the color image having been formed by the plurality of recording heads 51. Moreover, the irradiation light intensity and the timing for turning the UV irradiators 61, 62, 63 on and off are also controlled by the printer control unit 200.

The printer control unit 200 also governs a function for controlling the conveyance of the sheet S, as described in detail with reference to FIG. 1. In other words, among the members constituting the sheet conveyance system, a motor is respectively connected to the feed-out spindle 20, the front drive roller 31, the rear drive roller 32, and the take-up spindle 40. The printer control unit 200 controls the speed and torque of each of the motors while also causing the motors to rotate, thus controlling the conveyance of the sheet S. The details of this control of the conveyance of the sheet S are as follows.

The printer control unit 200 causes a feed-out motor M20 for driving the feed-out spindle 20 to rotate, and supplies the sheet S from the feed-out spindle 20 to the front drive roller 31. The printer control unit 200 herein controls the torque of the feed-out motor M20 to adjust the tension (feed-out tension Ta) from the feed-out spindle 20 to the front drive roller 31. Namely, a tension sensor S21 for detecting the feed-out tension Ta is mounted onto the driven roller 21 arranged between the feed-out spindle 20 and the front drive roller 31. The tension sensor S21 can be constituted of, for example, a load cell for detecting the force received from the sheet S. The printer control unit 200 carries out a feedback control of the torque of the feed-out motor M20 on the basis of a result of detection from the tension sensor S21, and thus adjusts the feed-out tension Ta of the sheet S.

The printer control unit 200 also rotates a front drive motor M31 for driving the front drive roller 31 and a rear drive motor M32 for driving the rear drive roller 32. The sheet S having been fed out from the feed-out part 2 is thereby passed through the process part 3. Herein, speed control is executed for the front drive motor M31, whereas torque control is executed for the rear drive motor M32. In other words, the printer control unit 200 adjusts the rotational speed of the front drive motor M31 to a constant speed, on the basis of an encoder output for the front drive motor M31. The sheet S is thereby conveyed at a constant speed by the front drive roller 31.

On the other hand, the printer control unit 200 controls the torque of the rear drive motor M32 and thus adjusts the tension (process tension Tb) of the sheet S from the front drive roller 31 to the rear drive roller 32. Namely, a tension sensor S34 for detecting the process tension Tb is attached to the driven roller 34 arranged between the rotating drum 30 and the rear drive roller 32. This tension sensor S34 can be constituted, for example, of a load cell for detecting the force received from the sheet S. The printer control unit 200 also carries out feedback control of the torque of the rear drive motor M32 on the basis of a detection result from the tension sensor S34, and thus adjusts the process tension Tb of the sheet S.

The printer control unit 200 rotates a take-up motor M40 for driving the take-up spindle 40, and causes the take-up spindle 40 to take up the sheet S being conveyed by the rear drive roller 32. Herein, the printer control unit 200 controls the torque of the take-up motor M40 and thus adjusts the tension (take-up tension Tc) of the sheet S from the rear drive roller 32 to the take-up spindle 40. Namely, a tension sensor S41 for detecting the take-up tension Tc is mounted onto the driven roller 41 arranged between the rear drive roller 32 and the take-up spindle 40. This tension sensor S41 can be constituted, for example, of a load cell for detecting the force received from the sheet S. The printer control unit 200 carries out a feedback control of the torque of the take-up motor M40 on the basis of a result of detection of the tension sensor S41, and thus adjusts the take-up tension Tc of the sheet S.

Furthermore, the printer control unit 200 is also responsible for a control function in the previously described steering mechanism 7 provided in the feed-out part 2, and adjusts the position of the end of the sheet S to a target position in the width direction Dw by performing feedback control of the width direction drive part 71 on the basis of the result of detection of the edge sensor 70. The target position is set so that the positions of the center lines of the drive rollers 31, 32 match the center line of the sheet S in the width direction Dw. As such, the sheet S is conveyed in the direction of conveyance Ds so that the center line of the sheet S passes through the center line of the drive rollers 31, 32. This makes it possible to convey the sheet S in the direction of conveyance Ds while also suppressing any deviation of the sheet S in the width direction Dw, because the load received by the sheet S from the nip formed by the drive rollers 31, 32 is evened in the width direction Dw.

The printer control unit 200 receives the result of detection of the seam sensors 80 and controls the image formation (image recording) on the sheet S. As a more specific example, the printer control unit 200 controls each of the motors M20, M31, M32, M40 on the basis of the result of detection of the seam sensors 80, and thereby adjusts the conveyance of the sheet S, and controls so as to remove the seam and begin the image formation. An image is thereby formed in a region where the seam has been removed.

Figure 3:
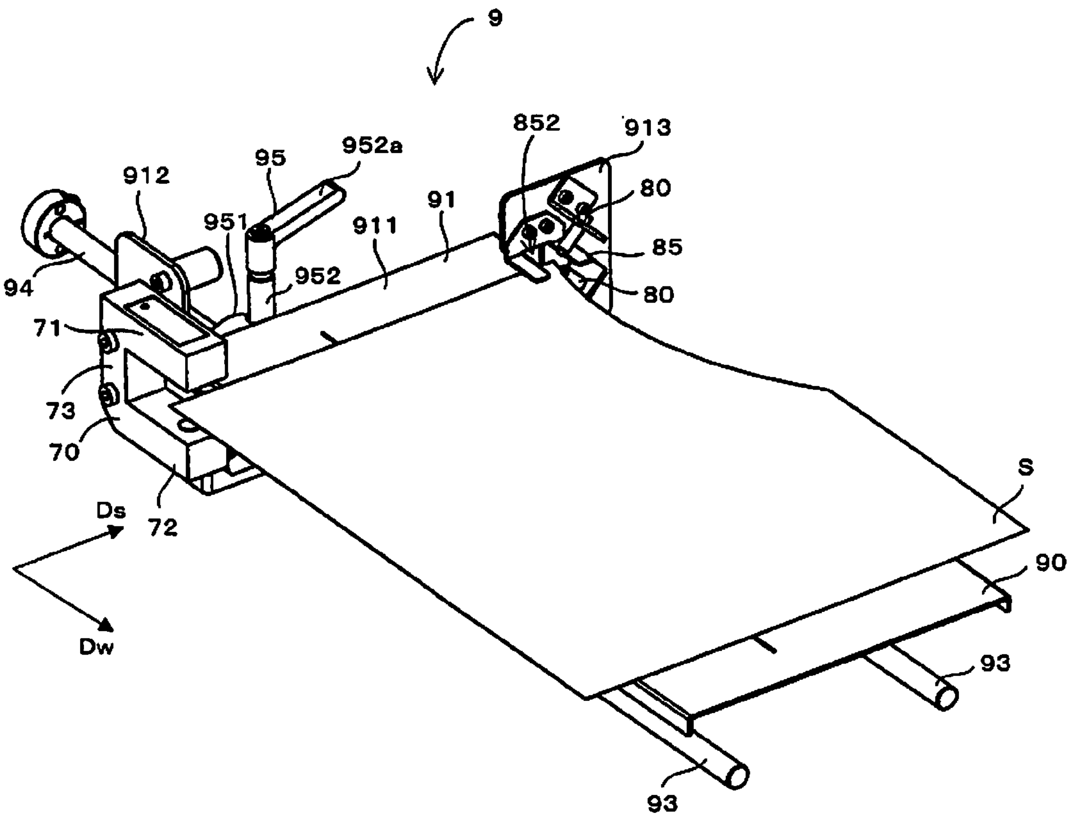
FIG. 3 is a perspective view schematically illustrating an exemplary summary of a sheet detection device and the surroundings thereof.
Figure 4:
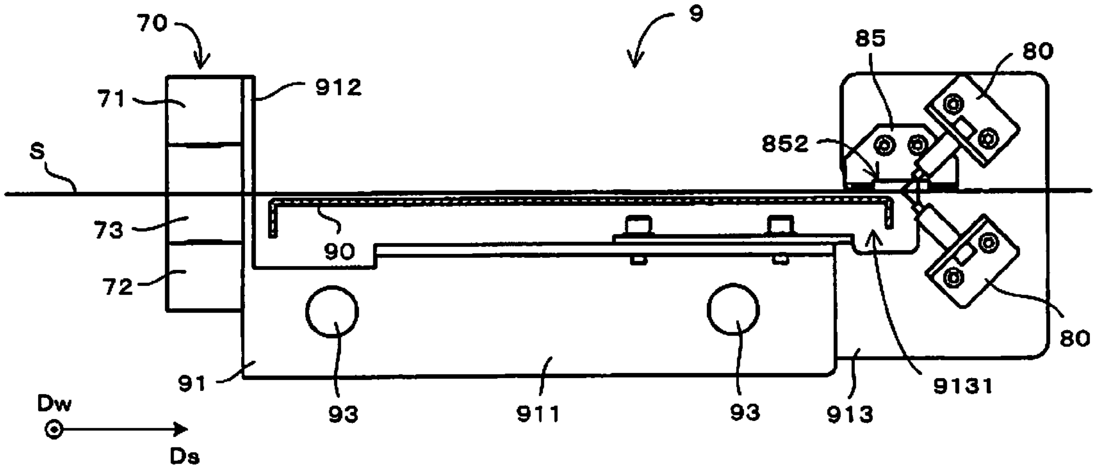
FIG. 4 is a front view schematically illustrating a summary of a sheet detection device.

The foregoing is a summary of the electrical configuration for controlling the printer 1. The sheet detection device 9 shall be described next in greater detail. FIG. 3 is a perspective view schematically illustrating an exemplary summary of a sheet detection device and the surroundings thereof. FIG. 4 is a front view schematically illustrating a summary of a sheet detection device. In FIGS. 3 and 4, the sheet S is also presented, along with the sheet detection device 9.

The sheet detection device 9 has a carriage 91, which is movable in the width direction Dw; the carriage 91 supports the seam sensors 80 and the edge sensor 70, provided to the same end in the width direction Dw of the sheet S being conveyed along the conveyance path Pc. This carriage 91 is constituted of a link frame 911 that extends in the direction of conveyance Ds, an upstream frame 912 that is screwed onto the link frame 911 from the upstream side in the direction of conveyance Ds, and a downstream frame 913 that is screwed onto the link frame 911 from the downstream side in the direction of conveyance Ds.

The upstream frame 912 is attached to an upstream end part of the direction of conveyance Ds of the link frame 911, and the edge sensor 70 is fixed by screwing to the upstream frame 912. The edge sensor 70 is constituted of a transmitter 71 for transmitting ultrasonic waves, a receiver 72 for receiving ultrasonic waves, and a support member 73 for connecting together and supporting the transmitter 71 and the receiver 72. The transmitter 71 and the receiver 72 are arranged across the conveyance path Pc. The transmitter 71 transmits the ultrasonic waves to a circular detection region having about 10 mm of width in the width direction Dw, and the receiver 72 receives ultrasonic waves that have passed through the detection region and outputs a result of detection to the printer control unit 200. Then, the printer control unit 200 detects an end of the sheet S in the width direction Ds on the basis of the result of detection coming from the edge sensor 70.

The downstream frame 913 is attached to a downstream end part of the direction of conveyance Ds of the link frame 911, and the seam sensors 80 are fixed to by screwing to the downstream frame 913. The seam sensors 80 irradiate a detection region having about 2 mm of width in the width direction Dw with light, and detect light that is diffused in the detection region. Here, the seam sensors 80 is arranged at an incline of about 45° relative to the normal line of the sheet S being conveyed along the conveyance path Pc. Then, the seam sensors 80 irradiate the sheet S with light from a direction inclined by about 45° in the direction of conveyance Ds relative to the normal line of the sheet S at a position facing the seam sensors 80. As such, the region of detection of the seam sensors 80 has a narrower width in the width direction Dw compared to the direction of conveyance Ds.

The result of detection of the seam sensors 80 is outputted to the printer control unit 200. The printer control unit 200 detects the seam of the sheet S by distinguishing between the sheet S surface and a splicing tape on the basis of a color shown by the result of detection of the seam sensors 80. The seam sensors 80 are each arranged at the front and reverse surfaces of the sheet S. This is in order to address a case where the splicing tape is found on the front surface of the sheet S and a case where the splicing tape is found on the reverse surface of the sheet S; in the detection of the seam, the seam sensor 80 of the side where the splicing tape is present is alternately used.

Also fixed to the downstream frame is a vibration suppression member 85, by screwing. The vibration suppression member 85 is arranged close to the conveyance path PC, and faces, spaced apart with a slight clearance, the front surface of the sheet S being conveyed along the conveyance path Pc. As such, even when the sheet S flaps with the air flow or otherwise vibrates upward, the vibration suppression member 85 abuts against the front surface of the sheet S, making it possible to suppress any vibration of the sheet S.

The vibration suppression member 85 is arranged between the seam sensor 80 and the sheet S being conveyed along the conveyance path Pc. Therefore, a light-projecting hole 852 is arranged perforating through the vibration suppression member 85 so that the vibration suppression member 85 does not interfere with the light with which the seam sensor 80 irradiates the sheet S. As such, the seam sensor 80 irradiates the sheet S with light via the light-projecting hole 852. Of the light that has been diffused at the sheet S, light that has passed through the light-projecting hole 852 is incident on the seam sensor 80 and detected.

The carriage 91 thus supporting the edge sensor 70 and the seam sensor 80 at both end parts in the direction of conveyance Ds is configured so as to be movable in the width direction Ds. Namely, the sheet detection device 9 has two guide shafts 93 that are fixed to a main body frame (not shown) of the printer 1 and extend in the width direction Dw. Two holes are in turn provided to the carriage 91, the holes perforating through in the width direction Dw, and the two guide shafts 93 are inserted into the two holes of the carriage 91. Thus, the carriage 91 is supported so as to be movable in the width direction Dw by the two guide shafts 93, and the movement of the carriage 91 is guided in the width direction Dw by these guide shafts 93.

Furthermore, the sheet detection device 9 has a positioning shaft 94 extending in the width direction Dw. The positioning shaft 94 is attached to the link frame 911 of the carriage 91, and moves in the width direction Dw in association with the movement of the carriage 91. The movement of this positioning shaft 94 can be controlled by a clamp lever 95 (movement restricting means). Namely, the clamp lever 95 has a set collar 951 fixed to the main body frame, and a damper 952 for clamping the shaft 94, which is inserted into the set collar 951. When the clamper 952 is rotated to one side by a lever 952*a*, the clamper 952 nips the shaft 94 between an inner wall of the set collar 951 and the clamper 952, and the movement of the shaft 94 is restricted. When the clamper 952 is rotated to the other side by the lever 952*a*, the nipping of the shaft 94 between the damper 952 and the inner wall of the set collar 951 is released, and the movement of the shaft 94 is allowed.

In this manner, the carriage 91 of the sheet detection device 9 is configured so as to be movable in the width direction Dw while also supporting the edge sensor 70 and the seam detection sensors 80 in a state where the relative positional relationships of each are retained. As such, a worker can move the seam sensors 80 and the edge sensor 70 in conjunction with one another in the width direction Dw by moving the carriage 91 in the width direction Dw.

The splicing table 90 is arranged outside the paths of movement of the carriage 91, the edge sensor 70, the seam sensors 80, and the vibration suppression member 85, which move in the width direction Dw. More specifically, the splicing table 90 is arranged between the link frame 911 and the conveyance path Pc of the sheet S, and between the upstream frame 912 and the downstream frame 913. The upstream part in the direction of conveyance Ds of the downstream frame 913 is partially cut out, and the downstream part in the direction of conveyance Ds of the splicing table 90 is positioned in the cut-out part 9131 of the downstream frame 913. The above-described vibration suppression member 85, in turn, is partially overlapped with the cut-out part 9131 in the direction of conveyance Ds. As a result, the vibration suppression member 85 and the splicing table 90 are partially overlapped in the direction of conveyance Ds, and the sheet S being conveyed in the conveyance path Pc is nipped between. This makes it possible to effective suppress vertical vibration of the sheet S.

The splicing table 90 is equipped with a configuration that is elongated in the width direction Dw and short in the direction of conveyance Ds, where a flat stainless steel plate that is 2 mm in thickness is bent at both end parts in the direction of conveyance Ds, and is fixed to the main body frame 1F of the printer 1. The front surface (upper surface) of the splicing table 90 is arranged horizontally, and faces the reverse surface of the sheet S being conveyed along the conveyance path Pc. In the state where the sheet S is being conveyed in the conveyance path Pc, a slight clearance is provided between the front surface of the splicing table 90 and the reverse surface of the sheet S.

The splicing table 90 of such description is used as a work platform for when a worker is joining the sheets S together. To provide a more specific description, in a case such as where, for example, the sheet S of the feed-out spindle 20 is being replaced, it is necessary to join the new sheet S to the old sheet S that had been set onto the printer 1. Therefore, the worker performs on the splicing table 90 the work (splicing) of joining the upstream end in the direction of conveyance Ds of the old sheet S with the downstream end in the direction of conveyance Ds of the new sheet S, with the splicing tape. The edge sensor 70 and seam sensors 80 described above are removed from the splicing table 90 at the upstream side and downstream side, respectively, in the direction of conveyance Ds, and the worker performs the splicing without being obstructed by the sensors 70, 80.

Figure 5:
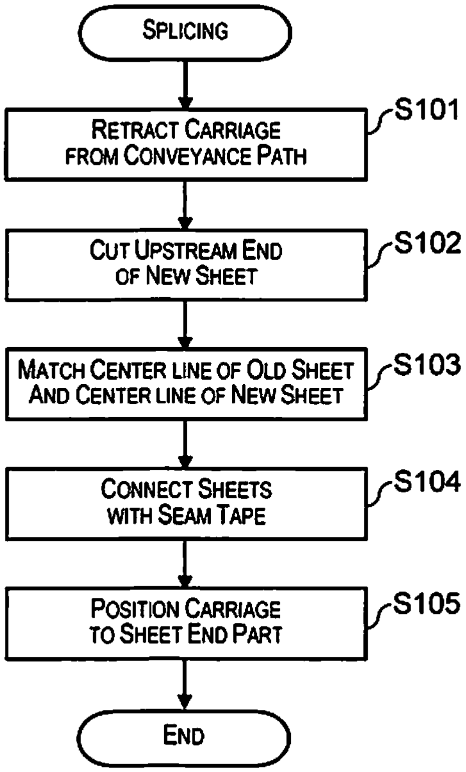
FIG. 5 is a flow chart illustrating one example of a task involving the movement of a sensor.
Figure 6:
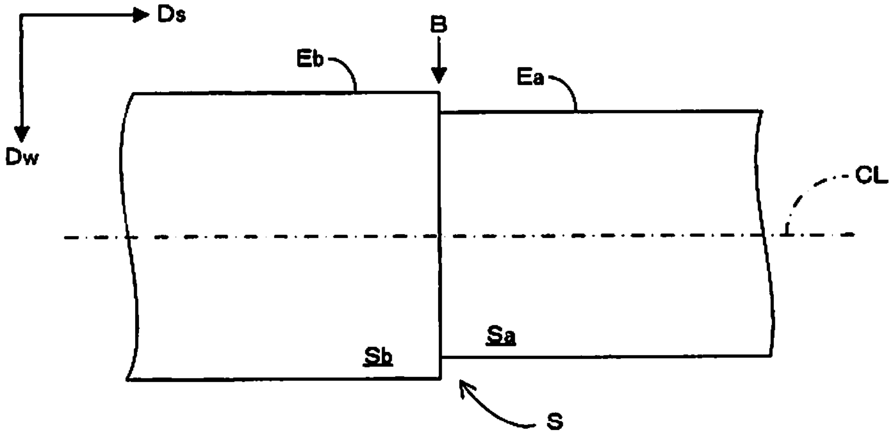
FIG. 6 is a plan view illustrating an example of a sheet that has been spliced by the flow in FIG. 5.

FIG. 5 is a flow chart illustrating one example of the work associated with the movement of the seam sensors and the edge sensor. FIG. 5 illustrates in particular a case where splicing of the sheet S is being performed. FIG. 6 is a plan view schematically illustrating an example of a sheet that has been spliced by the flow in FIG. 5. The example in FIG. 6 illustrates a case where a new sheet Sb positioned on the upstream side in the direction of conveyance Ds is joined at a seam B to an old sheet Sa positioned on the downstream side in the direction of conveyance Ds.

In a step S101, the worker opens the lever 952*a* and retracts the carriage 91 in the width direction Dw from the conveyance path Pc of the sheet S. The splicing can thus be executed on the splicing table 90, without interference on the carriage 91. In a step S102, the worker adjusts the shape of the upstream end of the new sheet Sb to a shape (for example, a shape parallel to the width direction Dw) suited for splicing by placing the upstream end on the splicing table 90 and cutting with a cutting edge such as a cutter. Then the worker matches the center line CL of the old sheet Sa already set on the printer 1 and the center line CL of the new sheet Sb, on the splicing table 90 (step S103), and connects the upstream end in the direction of conveyance Ds of the old sheet S and the downstream end in the direction of conveyance Ds of the new sheet S, with the splicing tape (step S104). As a result, the positions of the ends Ea, Eb in the width direction Dw of the sheet S are different, bounded by the seam B, as illustrated in FIG. 6.

In a step S105, the worker moves the carriage 91 in the width direction Dw and adjusts the position of the carriage 91 with respect to the end part Eb of the new sheet Sb. The positional adjustment of the carriage 91 is executed alongside with viewing of the positional relationship between the carriage 91 and a scale provided to the printer 1 or the end Eb of the sheet Sb. This positional adjustment positions the edge sensor 70 so that the detection region of the edge sensor 70 comprises the end of the sheet Sb in the width direction Dw. The seam sensors 80 are positioned so that the detection region of the seam sensors 80 is positioned inward by a predetermined width (about 2.5 mm) from the end of the sheet Sb in the width direction Dw. The range of about 4 mm from the end of the sheet Sb in the width direction Dw is set as a blank region where the image is not formed in the subsequent image formation. As such, the detection region of the seam sensors 80 will be included in the blank region provided to the end part of the sheet Sb in the width direction Dw. Thus, positioning the detection region of the seam sensors 80 inside the blank region of the sheet Sb makes it possible to retain the contrast between the colors of the splicing tape and the sheet Sb in the detection region, and thus to improve the detection accuracy of the seam. Then, when the positioning adjustment of the carriage 91 is completed, the worker closes the lever 952*a* and fixes the carriage 91 to the main body frame 1F of the printer 1.

As described above, in the embodiment thus configured, the relative positional relationship between the seam sensors 80 and the edge sensor 70 is defined by the carriage 91. Then, when the carriage 91 is moved outwardly or inwardly in the width direction Dw, both the seam sensors 80 and the edge sensor 70 move in conjunction with one another going outward in the width direction Dw or going inward. As such, both the seam sensors 80 and the edge sensor 70 can be moved at once going outward in the width direction Dw or going inward. Accordingly, even in a case where the positions of the ends of the sheet S in the width direction Dw are different, bounded by the seam, then the work of moving the seam sensors 80 and the work of moving the edge sensor 70 need not be performed separately but can be performed at once. In this manner, it becomes possible to efficiently perform the work of moving the seam sensors 80 and the edge sensor 70 in the width direction Dw in response to when the positions of the ends of the sheet S in the width direction Dw are different, and thus it becomes possible to improve the workability.

In the present embodiment, the sheet detection device 9 has the guide shafts 93 for guiding the movement of the carriage 91 in the width direction Dw. The configuration of such description allows for the carriage 91 to be easily moved in the width direction Dw in accordance with the guiding by the guide shafts 93, and contributes to improving the workability for the worker.

In the present embodiment, the sheet detection device 9 has the vibration suppression member 85, which is attached to the carriage 91 and faces the front surface and/or reverse surface of the sheet S. With such a configuration, any vibration of the sheet S can be suppressed by the vibration suppression member 85 facing the sheet S, and therefore it becomes possible for detection by the seam sensors 80 and the edge sensor 70 to be stably performed. In particular, in the present embodiment, the vibration suppression member 85 is provided between the seam sensors 80 and the sheet S being conveyed along the conveyance path Pc, and therefore any vibration of the sheet S can be effectively suppressed near the detection region of the seam sensors 80, and the detection by the seam sensors 80 can be extremely stably performed. Moreover, the vibration suppression member 85 is attached to the carriage 91. Accordingly, the work of moving the vibration suppression member 85 can be performed alongside the work of moving the seam sensors 80 and the edge sensor 70 in response to when the positions of the ends of the sheet S in the width direction Dw are different, and therefore such a configuration contributes to improving the workability for the worker.

In the present embodiment, the optical-type seam sensors 80 are used. Therefore, detecting the difference in color between the sheet S and the splicing tape, which is bonded to the seam as illustratively exemplified above, makes it possible to properly detect the seam.

In the present embodiment, the seam sensors 80 irradiates the sheet S with light from a direction inclined in the direction of conveyance Ds of the sheet S with respect to the normal lines of the sheet S, and the light that is reflected from the sheet S is detected. With such a configuration, a spot of the light with which the sheet S is irradiated is narrower in the width direction Dw orthogonal to the direction of conveyance Ds, compared to the direction of conveyance Ds. As such, the spot of the light can properly be made to fall within the blank region in such a case as where the seam is detected by detecting the difference in color between the splicing tape and the blank region provided to the end part in the width direction Dw of the sheet S, as illustratively exemplified above. As a result, it is possible to suppress any instances where light from an image recorded in a location out of the blank region is received and erroneously detected as being a seam.

Thus, as per the foregoing, in the present embodiment, the printer 1 corresponds to one example of an "image recording apparatus" of the present invention. The feed-out spindle 20, the rollers 21, 31 to 34, and 41, the rotating drum 30, and the take-up spindle 40 together correspond to one example of a "conveyance part" of the present invention. The sheet detection device 9 corresponds to one example of a "recording medium detection device" of the present invention. The edge sensor 70 corresponds to one example of a "first sensor" of the present invention. The seam sensors 80 correspond to one example of a "second sensor" of the present invention. The carriage 91 corresponds to one example of a "positional relationship regulation part" of the present invention. The guide shafts 93 correspond to one example of a "guide member" of the present invention. The vibration suppression member 85 corresponds to one example of a "vibration suppression member" of the present invention. The sheet S corresponds to one example of a "recording medium" of the present invention. The width direction Dw corresponds to one example of a "direction intersecting with a direction of conveyance of a recording medium" of the present invention.

Figure 7:
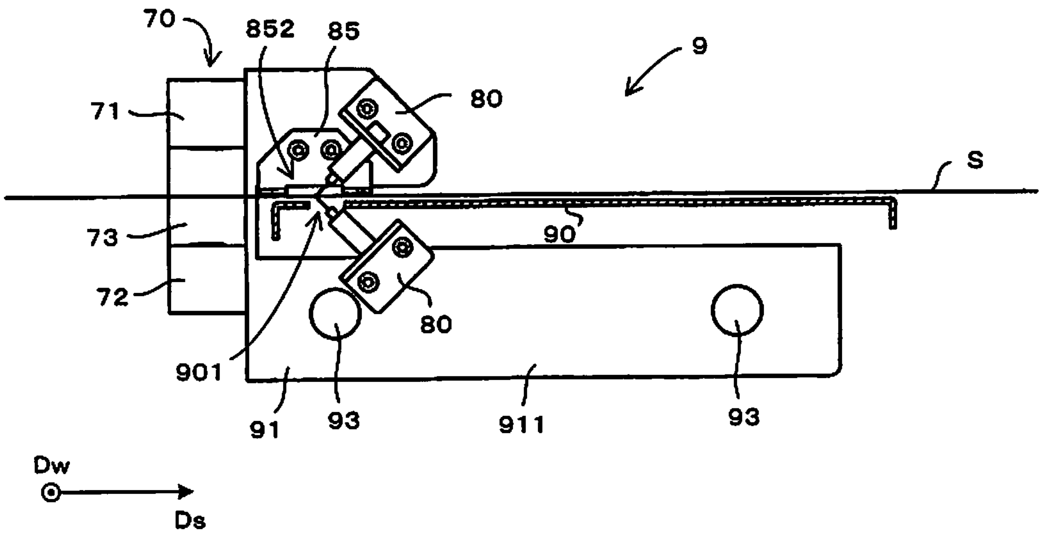
FIG. 7 is a front view illustrating a modification example for a sheet detection device.

The present invention is not to be limited to the embodiment described above; rather, a variety of different modifications can be added to what has been described above, provided that there is no departure from the spirit of the present invention. The sheet detection device 9 may therefore be configured as illustrated in FIG. 7. Here, FIG. 7 is a front view illustrating a modification example of the sheet detection device. In the example in FIG. 4, the edge sensor 70 and the seam sensors 80 are more apart than the dimensions of the splicing table 90 in the direction of conveyance Ds. In turn, in the example in FIG. 7, the edge sensor 70 and the seam sensors 80 are arranged in close proximity. In such an example, the splicing table 90 will be positioned between the seam sensor 80 provided to the reverse side of the sheet S and the conveyance path Pc of the sheet S. Therefore, a light-projecting hole 901 is formed perforating through the splicing table 90 so that the splicing table 90 does not interfere with the light with which the seam sensor 80 irradiates the sheet S. As such, the seam sensor 80 irradiates the sheet S with light via the light-projecting hole 901. Of the light that has been diffused at the sheet S, light that has passed through the light-projecting hole 901 is incident on the seam sensor 80 and detected.

The embodiment described above illustrated an example where the splicing and the sensor moving were performed continuously, with reference to FIG. 5. However, FIG. 5 merely illustrates one example of work by the worker, and the content of work that can be executed in a case where the present invention has been applied is not limited to the example of FIG. 5. For example, it would not be necessary for the worker to perform the splicing in a case where a previously spliced sheet S is used, where the sheets S of different widths have already been joined. As such, the worker need only move the sensors at an appropriate timing.

In the embodiment described above, the sheet detection device 9 also acts as the splicing table 90. However, the configuration may be such that the splicing table 90 is removed from the sheet detection device 9 and provided separately from the sheet detection device 9. Alternatively, the present invention could also be applied to a printer 1 not provided with the splicing table 90.

The specific configuration of the carriage 91 can also be modified as appropriate, as can the configuration for supporting the carriage 91 so as to be movable in the width direction Dw. The mode of fixation for the edge sensor 70 and the seam sensors 80 to the carriage 91 can also be modified as appropriate.

The locations of arrangement of the edge sensor 70 and the seam sensors 80 can be modified as appropriate, as can the angles of arrangement and the number arranged. As such, in the embodiment above, the edge sensor 70 and the seam sensors 80 were arranged in the stated order in the direction of conveyance Ds. However, it would also be possible to reverse the order in which these elements are arranged. Alternatively, in the embodiment described above, the seam sensors 80 were arranged at an incline. There is not necessarily a need, however, for the seam sensor 80 to be arranged at an incline.

The types of the edge sensor 70 and the seam sensors 80, too, are not limited to the examples given above. As such, an optical, ultrasonic, or other format of sensor could also be used as the edge sensor 70 or the seam sensors 80.

In the embodiment described above, the vibration suppression member 85 was provided with respect to the front surface of the sheet S. However, the vibration suppression member 85 may be provided with respect to the reverse surface of the sheet S, or may be provided to both the front surface and the reverse surface.

Also, in the embodiment described above, the edge sensor 70 and the seam sensors 80 are provided to the same one end of the sheet S. However, it would also be possible to configure the sheet detection device 9 by arranging the edge sensor 70 and the seam sensors 80 at mutually different ends of the sheet S. In such a case, the configuration need only be such that the seam sensors 80 and the edge sensor 70 move in conjunction with one another in mutually opposite directions. Configuring in this manner makes it possible to move both the seam sensors 80 and the edge sensor 70 at once outward in the width direction Dw or inward. Accordingly, even in a case where the positions of the ends of the sheet S in the width direction Dw are different, bounded by the seam, then the work of moving the seam sensors 80 and the work of moving the edge sensor 70 need not be performed separately but can be performed at once. As a result, it becomes possible to efficiently perform the work of moving the seam sensors 80 and the edge sensor 70 in the width direction Dw in response to when the positions of the ends of the sheet S in the width direction Dw are different, and thus it becomes possible to improve the workability.

Also, the embodiment described above illustratively exemplified a case where the present invention was applied to the printer 1, with which the sheet S is supported with a cylindrical support part (the rotating drum 30). However, the specific configuration for supporting the sheet S is not limited thereto. As such, the configuration may be one where the sheet S is supported on a plane belonging to a support part having a planar shape.

The number of, arrangement of, and colors discharged by the print heads 36*a* to 36*e*, inter alia, can also be modified as appropriate. The number, arrangement, and ultraviolet intensities of the UV lamps 37*a*, 37*b*, 38, inter alia, can also be modified as appropriate.

In the embodiment described above, the present invention was applied to the printer 1, which is provided with the print heads 36*a* to 36*e* for discharging the UV ink. However, the present invention may instead also be applied to a printer provided with print heads for discharging inks other than the UV inks, e.g., a water-based ink such as a resin ink. Alternatively, the present invention may be applied to a printer that performs printing by using something other than ink.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. An image recording apparatus comprising:

a conveyance part configured to convey a recording medium;

a first sensor configured to perform a detection with respect to the recording medium;

a second sensor configured to perform a detection with respect to the recording medium at a position different from that of the first sensor; and a positional relationship regulation part configured to regulate a positional relationship between the first sensor and the second sensor, the first sensor and the second sensor being movable in conjunction with one another by moving the positional relationship regulation part, and being different types of sensors relative to each other, a distance between a position of the first sensor and a position of the second sensor in a direction of conveyance of the recording medium being larger than a distance between the position of the first sensor and the position of the second sensor in a widthwise direction of the recording medium.

2. The image recording apparatus as set forth in claim 1, further comprising a guide part configured to guide movement of a carriage of the positional relationship regulation part in a direction intersecting with the direction of conveyance of the recording medium.

3. The image recording apparatus as set forth in claim 1, further comprising a vibration suppression member attached to a carriage of the positional relationship regulation part to face the recording medium being conveyed, and configured to suppress vibration of the recording medium being conveyed.

4. The image recording apparatus as set forth in claim 1, wherein the first sensor is a sensor that is configured to detect an end of the recording medium, and the second sensor is a seam sensor that is configured to detect a seam of the recording medium.

5. The image recording apparatus as set forth in claim 4, wherein the seam sensor is configured to irradiate the recording medium with light from a direction inclined in the direction of conveyance with respect to a normal line of the recording medium at a position facing the seam sensor, and is configured to detect the light reflected from the recording medium.

6. The image recording apparatus as set forth in claim 1, wherein the positional relationship regulation part has a carriage that is movable in a state where the positional relationship between the first sensor and the second sensor is relatively retained.

7. A recording medium detection device comprising:

a first sensor configured to perform a detection with respect to a recording medium;

a second sensor configured to perform a detection with respect to the recording medium; and a positional relationship regulation part configured to regulate a positional relationship between the first sensor and the second sensor, the first sensor and the second sensor being movable in conjunction with one another by moving the positional relationship regulation part, and being different types of sensors relative to each other, a distance between a position of the first sensor and a position of the second sensor in a direction of conveyance of the recording medium being larger than a distance between the position of the first sensor and the position of the second sensor in a widthwise direction of the recording medium.

8. The recording medium detection device as set forth in claim 7, wherein the first sensor is a sensor that is configured to detect an end of the recording medium, and the second sensor is a seam sensor that is configured to detect a seam of the recording medium.

* * * * *